Patented Aug. 25, 1942

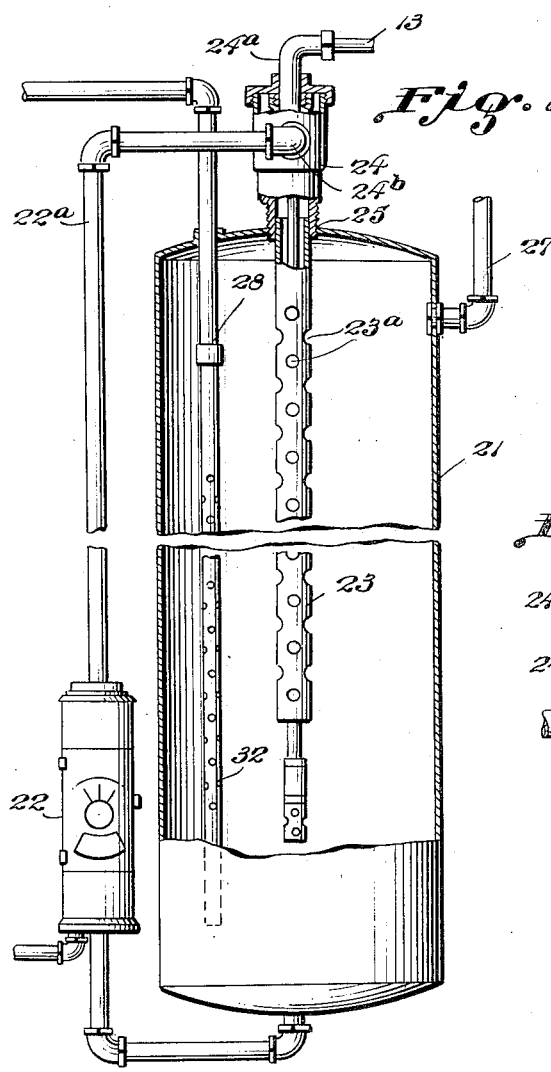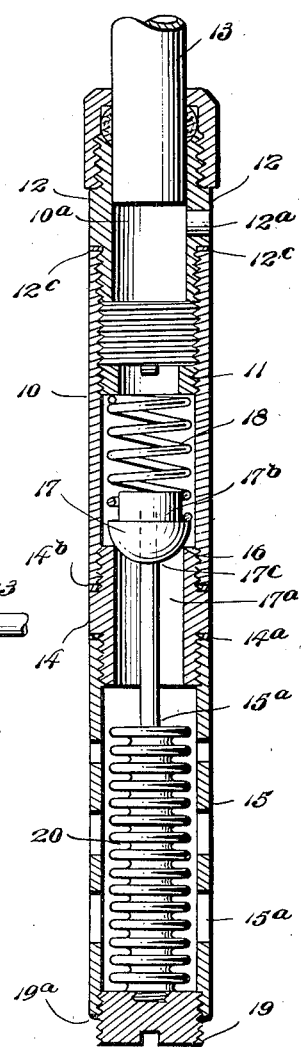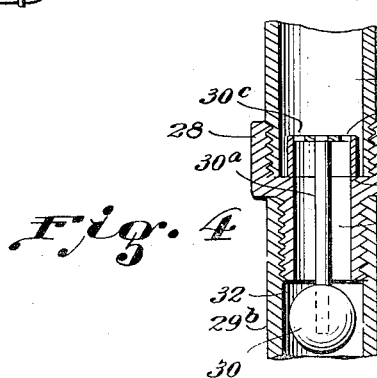

2,294,163

UNITED STATES PATENT OFFICE 2,294,163

HOT WATER HEATING SYSTEM

Edward F. Donnelly, Malden, and Thomas J. McCarthy, Peabody, Mass.

Application June 28, 1939, Serial No. 281,570

3 Claims. (Cl. 122—14)

This invention relates to hot water heating systems in which hot water is provided in storage tanks and withdrawn from the tanks for domestic use or other purposes.

An object of the invention is to provide means whereby the water in a storage tank can be heated throughout to a satisfactory temperature for use without danger of damage to the tank.

Another object of the invention is to provide means for preventing injury to the tank from excessive rise of temperature of the water in the tank.

Another object is to provide means for preventing injury to the tank by excessive rise of water pressure in the tank.

Another object is to provide means to prevent collapse of the tank through siphonage upon fall of water pressure.

The various objects set forth above and other advantages that will be mentioned hereinafter or understood by those skilled in the art are obtained by the construction and operations described in this specification.

Before describing our invention and its mode of operation, we desire to call attention to the drawing that accompanies this application for a patent as a part thereof, and in which Figure 1 is a side view of a complete installation, the side of the tank being cut away; Figure 2 is a detail looking downward at the connection on the top of the tank; Figure 3 is a side view of the relief valve, partly in section; and Figure 4 is a side view of the vacuum valve, partly in section.

Referring to the drawing, we provide a relief casing 10 having a relief chamber 10a threaded at one end to engage a threaded adjustment ring 11 and a press fitting 12 to which is attached a relief tube 13. 12a is a fusible plug and 12c a washer. An adjustable removable valve seat bushing 14 is threaded for attachment to the relief casing and is also threaded for attachment to a protective casing 15 and for attachment to pressure testing apparatus for spring adjustment. 14a is a solder seal. In bushing 14 is a valve seat 16 adapted to receive a valve 17 mounted on a valve stem 17a. Between valve 17 and ring 11, and butting against both, is a compression spring 18 of slightly less diameter than the diameter of relief chamber 10a. Casing 15 is threaded to receive an adjustment nut 19 to which is removably attached a thermostatic bellows 20, positioned within protective casing 15. 19a is a solder seal. Apertures 15a are provided in the wall of casing 15. 21 is a hot water tank, 22 is a heater and 22a is a pipe leading from the heater.

As shown in Figure 1, the relief valve is submerged in the hot water storage tank. Surrounding the relief tube is a pipe 23 which is attached to a fitting 25 positioned in the top of the tank. In pipe 23 are apertures 23a. The connection 24 is attached to fitting 25. In connection 24 is a port through which the relief tube passes and at which the relief tube is supported and held in position by means of fitting 24a. Attached to connection 24 is an elbow joint 24b to which pipe 22a is connected at one end. 27 is the hot water distributing pipe.

The vacuum valve comprises a casing 28 positioned inside of the tank between two sections 29a and 29b of the cold water supply pipe and having a chamber 28a, a valve seat 28b in the chamber being adapted to engage a suitable valve 30 attached to a stem 30a on which is a perforated disc or other support 30b which engages a shoulder 31 in casing 28 when valve 30 is in open position. 30c are vents in support 30b. A plurality of holes 32 is provided in the cold water supply pipe below the vacuum valve.

When positioning the relief valve in the tank, fitting 24a is attached to the relief tube at a proper distance from the relief valve to position the valve as desired in the water of the tank, our preferred position being a little below the middle of the tank, although positioning it elsewhere within the tank comes within the scope of our invention. Connection 24, fitting 25 and pipe 23 having been positioned as shown in Figure 1, the relief valve and relief tube are passed through the connection and fitting into the tank. Fitting 25 is then attached to connection 24, thus positioning the relief valve in the tank. Tube 13 is composed of lead or other metal that may be easily bent for positioning the relief unit and the length of the tube outside of the tank is such that, after installation, the fitting 24a may be loosened and the relief unit lowered or raised.

Normally, the relief valve is closed and the vacuum valve is open. The storage tank being full of water and the heater in operation, hot water passes through pipe 22a to connection 24 and through pipe 23 into the tank. This hot water passing through the end of pipe 23 and through apertures 23a into the colder water of the tank heats the tank water well below the top of the tank, setting up a quick circulation which results in rapid heating of the whole body of water in the tank. The resultant advantage is a great advance in the art. In other installations the hot water pipe is connected to a fitting in the top of the tank or passes into the tank for a few (not more than two or three) inches and heats the water at the top of the tank to a high temperature, leaving the remainder of the water cold or lukewarm, and because the relief valve is positioned in or near the path of the hottest water the known result is that in such installations the relief valves open to drainage when only a small amount of water is heated properly and repeat the operation so frequently that the volume of hot water in the tank cannot be increased. On the other hand the present invention allows the water to become thoroughly heated throughout before the relief valve opens. Repeated tests show that the water in the tank is heated to the following temperatures at the opening of the relief valve: at the bottom 115°; at the positions of the relief valve as shown in Figure 1, 160°; and at the top 190°; the water showing a uniform increase of heat from the bottom to the top.

Thermostatic bellows 33 is charged with expansible fluid to open at a predetermined temperature well below 212°.

The operation of the relief valve is as follows: When the temperature of the water immediately surrounding the bellows rises to the degree at which the bellows will open, the expansion of the bellows acts to overcome the resistance of spring 18, exerts pressure on valve stem 17$^a$ and forces valve 17 away from valve seat 16. Thereupon water flows through apertures 15$^a$, casing 15, valve port 16, relief chamber 10$^a$ and relief tube 13 to drainage. Cold water entering the tank through the service pipe to replace the hot water that is draining from the tank lowers the temperature of the water. Upon reduction of the water temperature below the actuating temperature of the bellows, the latter contracts and spring 18 reseats valve 17. Fusible plug 12$^a$ melts allowing flow to drainage if for any reason the relief valve fails to open upon rise of temperature.

During the heating of the water apertures 32 in the cold water pipe assist circulation of the water in the tank. Movement of the water as it becomes heated towards the bottom of the tank reacts through the cold water pipe apertures thus assisting in the speed of heating the water in less time and at less expense than heretofore. Also, in ordinary use, when water is withdrawn from the tank by opening a hot water faucet, cooling of the water is delayed by the passage of cold water into the hot water of the tank, the greater volume of hot water delaying the cooling effect of the inflowing cold water by direct contact within the cold water pipe.

Water pressure above the predetermined resistance pressure to which spring 18 has been adjusted forces relief valve 17 to open by direct pressure of the water on the valve and allow water to flow through the valve port, relief chamber and relief tube to drainage. Upon reduction of the water pressure to normal the spring reseats the valve.

A fault in many other valve constructions resulting in building up the pressure is due to the use of washers or other minor pieces. We avoid this by our simple construction as shown in the drawing and described, with the result that our valve gives positive action at the predetermined pressure or temperature. While not claiming it as invention, we use Monel metal for the seat and the valve and all other submerged parts are of the best noncorrosive metal.

As is well known, the water in the main service pipe is usually held at or near a predetermined pressure. If for any reason, as for example, a break in the service main, the service pressure drops so that there is not adequate pressure to hold water in the system, including the tank, or, if the water is shut off at the entrance from the main, lowering of pressure causes loss of water in the system. In other constructions, this withdrawal of water sets up a siphoning of the tank water due to the relative positions of the hot water connections at the top and the end of the cold water supply pipe near the bottom of the tank and causes the tank to collapse. The street shut-off is positioned between the main and the water meter. If the water in the tank is hot when the lowering of pressure occurs, this hot water is siphoned out through the cold water pipe and through the meter and damages the meter diaphragm, making repairs to or replacement of the meter necessary. If the tank does not collapse, the loss of water may cause a dangerous condition as, under such a condition if the tank water is being heated there is danger of creating steam rapidly and causing strain on the tank or an explosion.

Other vacuum valves are placed on the outsides of the tanks and if they do not operate frequently they become inefficient. This may be due to accumulation of dirt and sometimes by being painted, causing the valves to become inoperative.

Another difficulty that exists where other vacuum valves are used is this: In a house, for example, that has apartments on three floors, all on the same house system, if the water pressure is too low an open faucet on the first floor will withdraw water from the third floor tank.

Our vacuum valve is so constructed and positioned in the tank that it overcomes all of the difficulties mentioned and acts efficiently whenever called upon to operate because it is also always active. Its operation is simple and needs no further explanation, except to say that when the pressure is lowered to the extent that water starts to run out through the cold water pipe valve 30 is forced against valve seat 28$^b$ thus holding the water in the tank and when the pressure is restored the inflowing water opens the valve to normal position.

In the use of other installations, if the pressure water is shut off and the heater is going and continues in operation a most dangerous condition arises, as stated above, as siphonage from the tank permits the rapid creation of steam. A distinct advantage provided by the cooperative action of our relief valve and vacuum valve is that the closing of valve 30 prevents siphonage and the tank remains full of water until the rise of temperature opens the relief valve to release of hot water or steam. This system positively prevents the development of dangerous steam pressure. In addition to the opening of the relief valve by extension of the bellows, as already described, to give full flow through the relief tube, the parts of the relief valve are so positioned and adjusted with relation to each other and to the bellows that the slight extension of the bellows which takes place just before full extension occurs can be made to cause drip through the relief tube which does not interfere with the heating of the water and assists in creating a full tank of hot water without danger of excessive rise of temperature.

It will be seen from the foregoing description, and has been proven by the most severe laboratory tests, that this system provides positive automatic temperature, pressure and vacuum control and permits proper heating of a much greater volume of water than can be obtained by any other automatically controlled system, without developing conditions which cause injury or damage. No danger of damage from excessive rise of temperature, or water pressure can develop, nor can the tank collapse because of the fall of water pressure.

For purposes of illustration, we have described our invention installed in a vertical tank of a heating system; but it is adapted for use in tanks placed in other positions as well as vertical and such uses come within the scope of our invention as do also any modification of parts, or assembly or position that comes within the scope of the appended claims.

Having described our invention and its operation, what we claim is:

1. In a heating system, a storage tank having a hot water supply pipe through which the tank may be supplied with hot water under pressure and having operatively connected therewith a relief tube extending into the tank and a temperature responsive valve on the end of the tube within the tank, and means to heat the water in the tank, said means including an open ended extension of the hot water supply pipe into the body of water in the tank, the extension surrounding the relief tube and being positioned above the temperature responsive valve, the open end of the extension being above and adjacent to the temperature responsive valve and the extension having apertures in its walls, as described.

2. In a heating system having a storage tank for water under pressure, means for opening the tank to drainage including a relief tube, said means further comprising a temperature responsive valve mounted on the relief tube and positioned in the water of the tank, and a fitting in the top of the tank through which the relief tube extends into the tank and is held in operative position, the valve being adapted to open upon rise of temperature of the water immediately surrounding the valve above a predetermined degree and adapted to close upon lowering of the water temperature below said opening temperature after said opening operation, and means for providing uniform heat in the body of water in the tank, said means including a hot water supply pipe extending into the body of water in the tank, said extension surrounding the relief tube, having an open end adjacent to and above the valve and having apertures in its wall.

3. In a heating system, a storage tank having a hot water supply pipe through which the tank may be supplied with hot water under pressure, means for opening the tank to drainage through a relief tube upon rise of either tank water temperature or water pressure, said means comprising a relief tube extending into the tank and having a temperature and pressure responsive valve positioned in the water within the tank by means thereof and a fitting engaging the tube and the top of the tank, the valve being adapted to open upon rise of the temperature of the water immediately surrounding the valve above a predetermined degree, also adapted to be opened by direct pressure thereon of the tank water upon rise of the water pressure above a predetermined pressure, and adapted to close upon lowering of the water temperature below said opening temperature and lowering of the water pressure below said opening pressure after said opening operations, and means to heat the water in the tank, said means including an open ended extension of the hot water supply pipe within the tank, said extension surrounding the relief tube, having its open end above the valve and having apertures in its wall.

EDWARD F. DONNELLY.
THOMAS J. McCARTHY.